W. HUMBERSTONE.
Improvement in Traction-Engines.
No. 131,615. Patented Sep. 24, 1872.
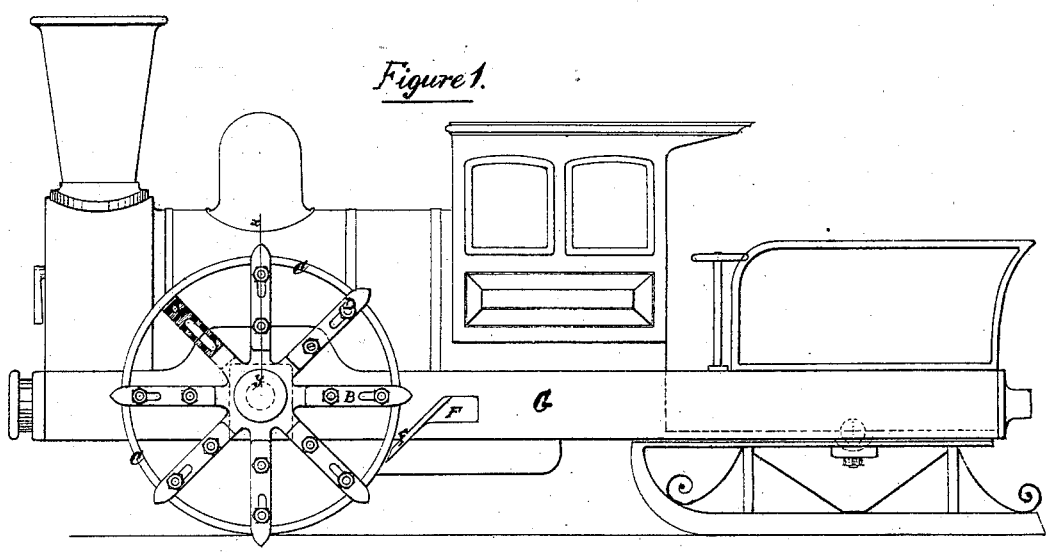
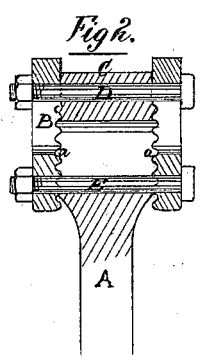
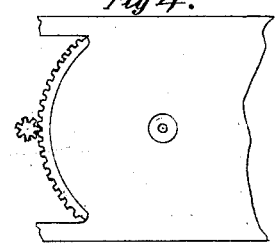
Inventor:
William Humberstone
By
Donald C. Ridout &co
Attorneys
J. H. Bartlett
Wm Sheppard
Witnesses.

UNITED STATES PATENT OFFICE.

WILLIAM HUMBERSTONE, OF NEWTON BROOK, CANADA.

IMPROVEMENT IN TRACTION-ENGINES.

Specification forming part of Letters Patent No. 131,615, dated September 24, 1872.

*To all whom it may concern:*

Be it known that I, WILLIAM HUMBERSTONE, of the village of Newton Brook, in the county of York, Province of Ontario, Canada, have invented certain Improvements in Traction-Engines, of which the following is a specification:

The invention consists, among other things, in the peculiar attachment of spikes or calks, so arranged around the periphery of the wheel that the said spikes can be lengthened or shortened, as circumstances may require, for the purpose hereafter described; the object being to enable traction-engines to travel over ice and snow.

Figure 1 is a side elevation of traction-engine for ice. Fig. 2 is section through $x y$, showing manner of attaching calks. Fig. 3 is a section of sleigh-joint. Fig. 4 shows steering apparatus.

The wheel is the chief peculiarity of my engine, and being so I shall proceed to describe it first: To every spoke there are attached two spikes, B, one on each side of the rim C. By reference to Fig. 2, the manner in which the said spikes B are secured to the spokes A will readily be understood, and it will suffice to say that there is a rack cut in each spike B to correspond with the rack $a$ in the spokes A. When the bolts D and E are tightened the racks referred to fit together, as shown in Fig. 1, and thus hold the spikes B in the desired position. The bolt D passes through a round hole in the wheel, but an oblong one in the spikes B, while the bolt E reverses it by passing through an oblong hole in the wheel and a round one in the spikes B. When the traction-engine is about to pass over smooth ice it will only be necessary that the spikes B should project over the periphery of the wheel slighly, as shown in the drawing; but at other times, when the ice is covered by snow, they must project considerably more, in order to obtain a grip and prevent the wheel from slipping. This is done by simply loosening the nuts on the bolts D and E, unmesh the racks before referred to, when the spikes B may be lengthened or shortened, as required, and held in any desired position by again tightening the said nuts. The oblong holes through which the bolts pass permit the spikes B to be thus moved without the necessity for the removal of the bolts D and E. The scraper F is attached in any convenient manner to the frame G of the engine, and is applied to each wheel for the purpose of removing any snow which may adhere to the same. These scrapers may be multiplied in number, as circumstances may require, and formed into the most convenient shape. The wheels thus constructed constitute, of course, the drivers, and the power may be applied to them in various ways; hence my reason for not exhibiting the connection in my drawing. The greater portion of the weight is carried by these wheels, the remainder being supported by the runners H. These runners support the tail-end of my engine on a "ball-and-socket joint," as shown in Fig. 3. The sleigh formed by these two runners is moved by a rack and pinion motion, as shown in Fig. 4, or by chains in the ordinary manner.

What I claim as my invention is—

1. The combination of the spikes B, spokes A, bolts D and E, arranged and connected substantially as and for the purpose specified.

2. Supporting a traction-engine on wheels and runners, as described, the said runners H working on a ball-and-socket joint, and as a rudder for the said engine, substantially as described.

Toronto, May 22, 1872.

WILLIAM HUMBERSTONE.

Witnesses:
DONALD C. RIDOUT,
J. H. BARTLETT.